(12) United States Patent
Mihara

(10) Patent No.: US 10,884,277 B2
(45) Date of Patent: Jan. 5, 2021

(54) DISPLAY DEVICE FOR VEHICLE

(71) Applicant: DENSO CORPORATION, Kariya (JP)

(72) Inventor: Kenjiro Mihara, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/859,373

(22) Filed: Apr. 27, 2020

(65) Prior Publication Data

US 2020/0257159 A1 Aug. 13, 2020

Related U.S. Application Data

(63) Continuation of application No. PCT/JP2018/033432, filed on Sep. 10, 2018.

(30) Foreign Application Priority Data

Nov. 9, 2017 (JP) .................................. 2017-216361

(51) Int. Cl.
G02F 1/1333 (2006.01)

(52) U.S. Cl.
CPC .................. *G02F 1/133308* (2013.01); *G02F 2001/13332* (2013.01)

(58) Field of Classification Search
CPC ................................................ G02F 1/133308
See application file for complete search history.

(56) References Cited

U.S. PATENT DOCUMENTS

2016/0209580 A1* 7/2016 Hosoki ............... G02B 6/0091

FOREIGN PATENT DOCUMENTS

| JP | H02264222 A | 10/1990 |
|---|---|---|
| JP | 2009229964 A | 10/2009 |

* cited by examiner

*Primary Examiner* — Edmond C Lau
(74) *Attorney, Agent, or Firm* — Harness, Dickey & Pierce, P.L.C.

(57) ABSTRACT

A display device for a vehicle includes a front bezel, a liquid crystal body, a backlight, and a flexible cable connected to the liquid crystal body. The flexible cable includes a molding portion shaped to include a first bent portion, a second bent portion, a third bent portion, and a fourth bent portion arranged in order in a direction away from a tip end of the flexible cable. A part of the molding portion from the tip end to the first bent portion is in contact with the liquid crystal body. An end of the second bent portion further from the tip end of the flexible cable is in contact with the front bezel. The molding portion is shaped to generate a spring force in a thickness direction of the liquid crystal body to widen a distance between the front bezel and the liquid crystal body.

8 Claims, 10 Drawing Sheets

DISPLAY DEVICE FOR VEHICLE

CROSS REFERENCE TO RELATED APPLICATION

The present application is a continuation application of International Patent Application No. PCT/JP2018/033432 filed on Sep. 10, 2018, which designated the U.S. and claims the benefit of priority from Japanese Patent Application No. 2017-216361 filed on Nov. 9, 2017. The entire disclosures of all of the above applications are incorporated herein by reference.

TECHNICAL FIELD

The present disclosure relates to a display device for a vehicle.

BACKGROUND

A display device for a vehicle disposed in a vehicle cabin is provided. The display device for a vehicle is formed by assembling a front bezel, a liquid crystal body, and a backlight. The liquid crystal body is affixed to the front bezel and the backlight with a double coated tape, and the liquid crystal body is supported in the display device.

SUMMARY

According to an aspect of this disclosure, a display device includes a front bezel, a liquid crystal body, a backlight, and a flexible cable connected to the liquid crystal body at a predetermined position of the flexible cable. The flexible cable includes a molding portion shaped to have spring force. The liquid crystal body is fixed to the front bezel and the backlight with the molding portion.

DETAILED DESCRIPTION

Figure 1:
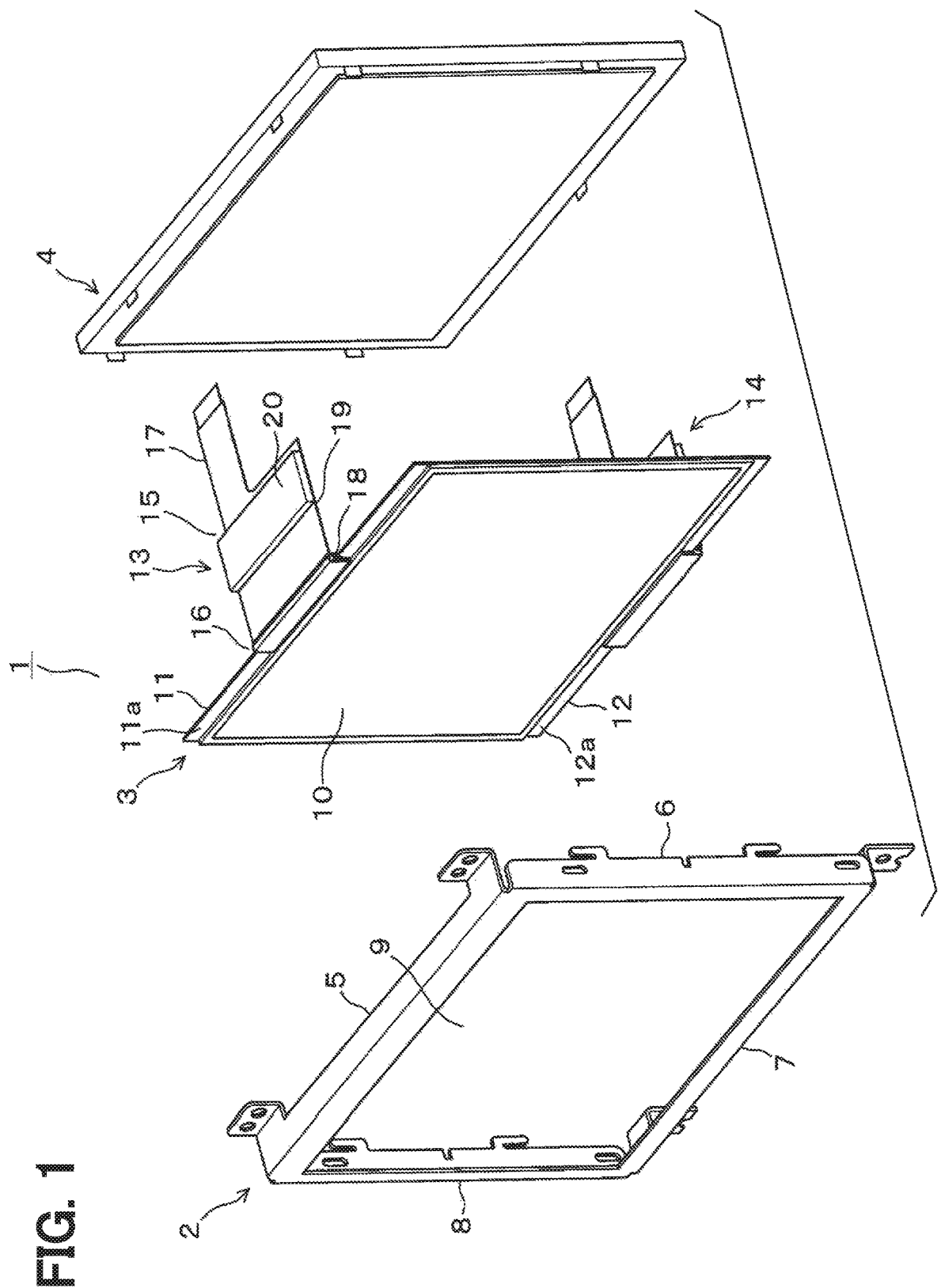
FIG. 1 is an exploded perspective view of a display device according to a first embodiment.

To begin with, examples of relevant techniques will be described.

A display device for a vehicle disposed in a vehicle cabin is provided. The display device for a vehicle is formed by assembling a front bezel, a liquid crystal body, and a backlight. A color liquid crystal is improving in viewing angle and resolution, thus the number of the liquid crystal bodies that apply an In Plane Switching (IPS) type liquid crystal is increasing. When external force is applied to the IPS type liquid crystal, stress derived from the external force causes a retardation that is a phase shift of a transmitted light. Due to the retardation, lights are likely to transmit through the liquid crystal. Thus, a configuration that relaxes the stress derived from the external force is needed when the external force is applied to a display device. In this respect, a double coated tape having supporting force and a cushion property to relax the stress is applied, the liquid crystal body is affixed to the front bezel and the backlight with the double coated tape, and the liquid crystal body is supported in the display device.

The configuration described above needs the double coated tape, which increases the number of members. In addition, the double coated tape having the cushion property is soft and likely to be deformed. In a step attaching the double coated tape to a predetermined position, the double coated tape is likely to be attached to an unsuitable position with deformed, and if the double coated tape is attached like such, the double coated tape needs to be reattached. If the double coated tape overlaps with a display surface of the liquid crystal body, a shadow is provided in a screen, which reduces a display quality. Thus, the double coated tape has a width set as thin as possible and is attached without overlapping the display surface. Thus, a step for attaching the double coated tape needs a high accuracy and is performed with careful. In addition, an extra step may be required for checking a position where the double coated tape is to be attached before attaching the double coated tape. Accordingly, a configuration with the double coated tape increases the number of members and is inferior in the assembly.

The present disclosure provides a display device for a vehicle that improves the assembly, reduces the number of members, and keeps a quality by relaxing a stress derived by external force when the external force is applied to the display device.

According to an aspect of this disclosure, a display device includes a front bezel, a liquid crystal body, a backlight, and a flexible cable connected to the liquid crystal body at a predetermined position of the flexible cable. The flexible cable includes a molding portion shaped to have spring force. The liquid crystal body is fixed to the front bezel and the backlight with the molding portion.

The molding portion of the flexible cable is shaped to have the spring force and the liquid crystal body is fixed to the front bezel and the backlight with the molding portion. The double coated tape is not needed in assembling the front bezel, the liquid crystal body, and the backlight, thereby reducing the number of members. In addition, a step for fixing the liquid crystal body with the front bezel and the backlight with the double coated tape is not required, which improves the assembly. Furthermore, when external force is applied to the display device, the spring force of the molding portion relieves stress derived from the external force, thereby avoiding a quality loss. Accordingly, in supporting the liquid crystal body in the display device, the display device can reduce the number of members, improve the assembly, and avoid the quality loss by relieving the stress derived from the external force even if the external force is applied to the display device.

Hereinafter, a first embodiment will be described with reference to FIGS. 1 to 6. As shown in FIG. 1, a display device 1 for a vehicle includes a front bezel 2, a liquid crystal body 3, and a backlight 4. The front bezel 2 is formed in a frame shape having a rectangular hollow space 9 surrounded by four sides that are an upper side 5, a right side 6, a lower side 7, and a left side 8. The liquid crystal body 3 adopts an In Plane Switching (IPS) type crystal liquid. The liquid crystal body 3 includes a display surface 10 having a slightly larger size than the hollow space 9 of the front bezel 2, an upper electrode, and a lower electrode. The upper electrode and the lower electrode are respectively located at a substantial center of a front surface 11a of an upper side 11 of the liquid crystal body 3 and a substantial center of a front surface 12a of a lower side 12 of the liquid crystal body 3. The upper electrode and the lower electrode are located oppositely in an up and down direction of the liquid crystal body 3. The upper electrode is connected to an upper flexible cable 13, and the lower electrode is connected to a lower flexible cable 14. The backlight 4 has a rectangular shape having a substantial same size with the liquid crystal body 3. The display device 1 for a vehicle is assembled with the front bezel 2, the liquid crystal body 3, and the backlight 4 such that the upper flexible cable 13 and the lower flexible cable 14 are joined, and the liquid crystal body 3 is located between the front bezel 2 and the backlight 4.

The upper flexible cable 13 and the lower flexible cable 14 have nearly the same configuration, thus in following, a configuration of the upper flexible cable 13 will be described. The upper flexible cable 13 is referred just as the flexible cable 13. A cable body 15 of the flexible cable 13 includes a wide portion 16 and a narrow portion 17. The wide portion 16 has a wider width than the narrow portion 17 (i.e., the narrow portion 17 has a narrower width than the wide portion 16). The wide portion 16 includes a molding portion 18 that is connected to the liquid crystal body 3 and a non-molding portion 19 that is connected to the narrow portion 17. An interface circuit 20 including electric members such as an IC, a capacitor, and a coil are installed near the narrow portion 17 of the non-molding portion 19.

Figure 2A:
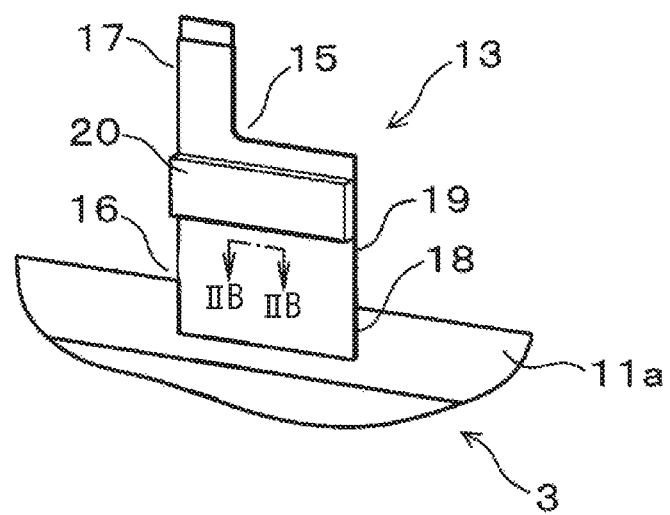
FIG. 2A is an enlarged view of a flexible cable of the display device.
Figure 2B:
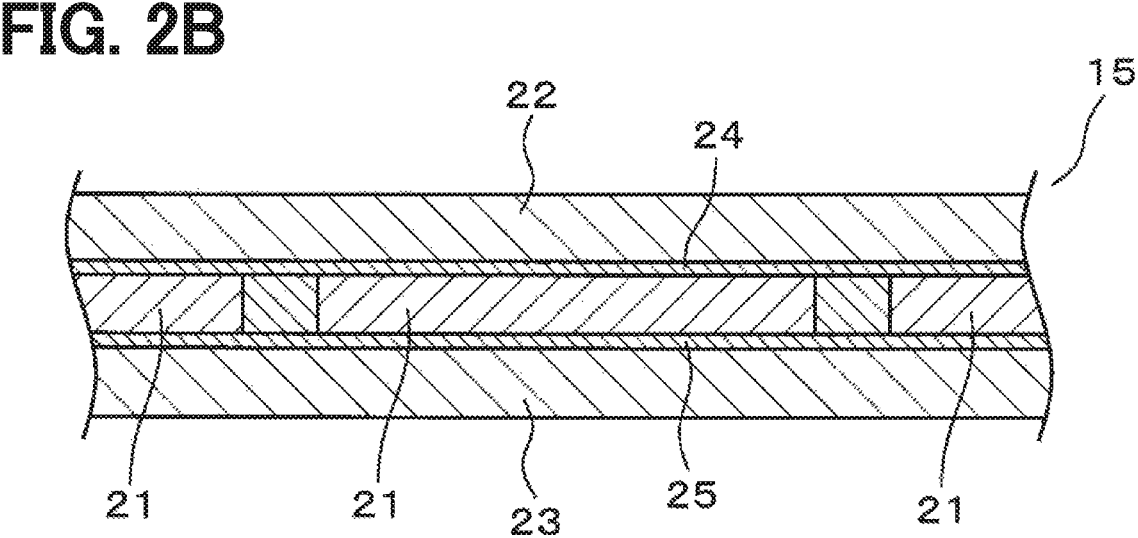
FIG. 2B is a cross-sectional view taken along a line IIB-IIB in FIG. 2A.

As shown in FIGS. 2A and 2B, the cable body 15 includes a conductive layer 21 made of cupper layers for transmitting electric signals and polymer layers 22 and 23 such as layers made of liquid crystal polymer, polyimide, or the like. The polymer layers 22 and 23 are respectively laminated to both surfaces of the conductive layer 21 with an epoxy type adhesive 24 and 25, and the conductive layer 21 is thereby protected and insulated by the polymer layers 22 and 23. The cable body 15 has a configuration in which the conductive layer 21 is laminated between the polymer layers 22 and 23, which allows the cable body 15 to be molded by drawing and bending. When the cable body 15 is bent from a flat shape, the cable body 15 generates spring force to return the cable body 15 to an initial shape.

Figure 3:
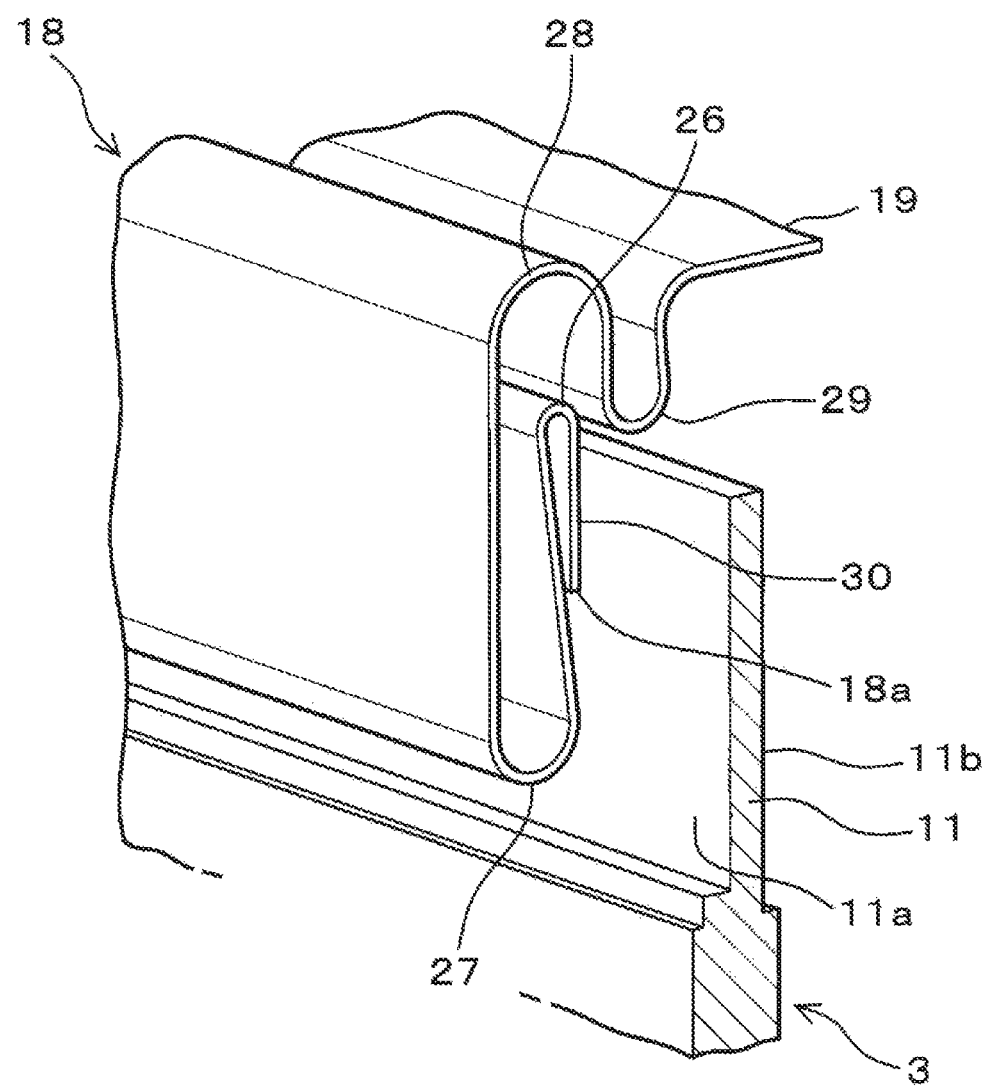
FIG. 3 is an enlarged perspective view of a molding portion of the flexible cable.

As shown in FIG. 3, the molding portion has a tip end 18a connected to the liquid crystal body 3. The molding portion 18 of the cable body 15 is bent to have a first bent portion 26, a second bent portion 27, a third bent portion 28, and a fourth bent portion 29 in this order in a direction away from the tip end 18a of the molding portion 18 toward the non-molding portion 19. Each of the first bent portion 26, second bent portion 27, third bent portion 28, and fourth bent portion 29 has a U shape, and two adjacent ones of the four bent portions 26, 27, 28, and 29 are coupled with a straight portion of the molding portion 18. Each of the first bent portion 26, second bent portion 27, third bent portion 28, and fourth bent portion 29 has a first end located closer to the tip end 18a, and a second end located away from the tip end 18a and closer to the non-molding portion 19. That is, the second end of the first bent portion 26 is connected to the first end 27a of the second end 27 with the straight portion. The second end 27b of the second bent portion 27 is connected to the first end 28a of the third bent portion 28 with the straight portion. The second end 28b of the third bent portion 28 is connected to the first end 29a of the fourth bent portion 29. A cable electrode 30 is provided between the tip end 18a and the first bent portion 26. The cable electrode 30 and the upper electrode of the liquid crystal body 3 are connected with each other through a conductive adhesive, which mechanically and electrically connects the flexible cable 13 with the liquid crystal body 3. In this case, the flexible cable 13 may be connected to the liquid crystal body 3 after the molding portion 18 is molded into the above-mentioned shape, or the molding portion 18 may be molded after the flexible cable 13 is connected to the liquid crystal body 3.

Figure 4:
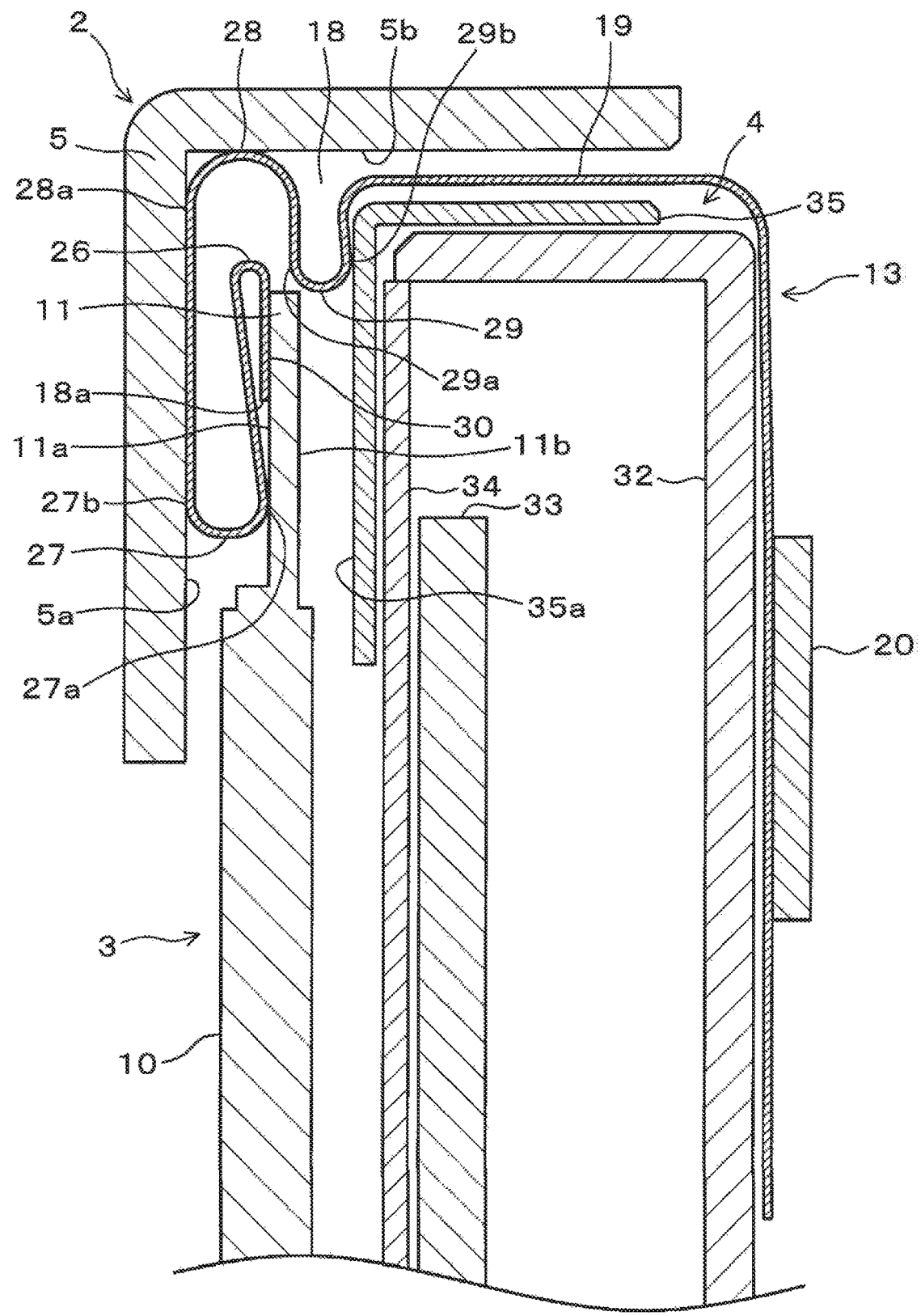
FIG. 4 is a vertical cross-sectional view illustrating an assembly of a front bezel, a liquid crystal body, and a backlight of the display device.

When the front bezel 2, the liquid crystal body 3, and the backlight 4 are assembled, the liquid crystal body 3 connected to the upper flexible cable 13 and the lower flexible cable 14 is positioned between the front bezel 2 and the backlight 4. After that, as shown in FIG. 4, the front bezel 2 and the liquid crystal body 3 are pressed against the backlight 4, and the front bezel 2 is fixed to the backlight 4 with bolts. The assembly can be easier by pressing the front bezel 2 and the liquid crystal body 3 against the backlight 4. The backlight 4 includes a diffusion plate 33, an optical sheet 34, a housing 32 having a cup shape, and a frame 35. The housing 32 houses the diffusion plate 33 and the optical sheet 34, and both ends of the optical sheet 34 are covered with the frame 35.

In case that the front bezel 2 and the liquid crystal body 3 are pressed against the backlight 4 for the assembly, the first end 27a of the second bent portion 27 is in contact with the front surface 11a of the upper side 11 of the liquid crystal body 3. The straight portion between the second end 27b of the second bent portion 27 and the first end 28a of the third bent portion 28 is in contact with a vertical inner surface 5a of the upper side 5 of the front bezel 2. A part of the third bent portion 28 is in contact with a horizontal inner surface 5b of the upper side 5 of the front bezel 2. The second end 29b of the fourth bent portion 29 is in contact with a vertical outer surface 35a of the frame 35 of the backlight 4. The first end 29a of the fourth bent portion 29 is not in contact with a back surface 11b of the upper side 11 of the liquid crystal body 3.

Figure 5:
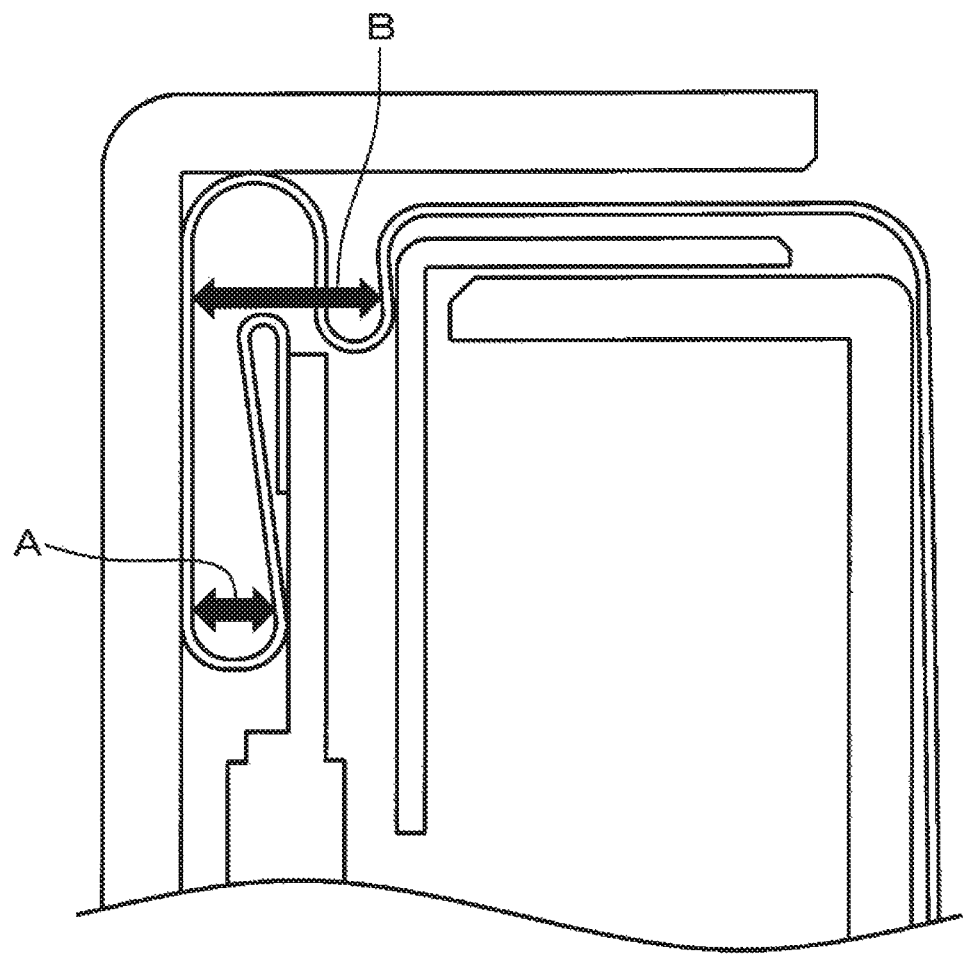
FIG. 5 is a schematic view illustrating spring force in the first embodiment.

In this case, as shown in FIG. 5, a spring force A is generated between the upper side 5 of the front bezel 2 and the upper side 11 of the liquid crystal body 3. The spring force A is applied in a direction to return the first bent portion 26 and the second bent portion 27 into the initial shapes. In other words, the spring force A is applied in a widening direction in which a distance between the upper side 5 of the front bezel 2 and the upper side 11 of the liquid crystal body 3 is widened. Similarly, a spring force B is generated between the upper side 5 of the front bezel 2 and the frame 35 of the backlight 4. The spring force B is applied in a direction to return the third bent portion 28 and the fourth bent portion 29 into initial shapes, i.e., in a widening direction in which a distance between the upper side 5 of the front bezel 2 and the frame 35 of the backlight 4 is widened. The liquid crystal body 3 is fixed with the front bezel 2 and the backlight 4 such that the spring force A between the upper side 5 of the front bezel 2 and the upper side 11 of the liquid crystal body 3 in the widening direction is balanced with the spring force B between the upper side 5 of the front bezel 2 and the frame 35 of the backlight 4 in the widening direction. Accordingly, the liquid crystal body 3 is supported in the display device 1.

When external force is applied to the display device 1 that has the spring forces A and B balanced each other, stress that breaks the balance between the spring forces A and B is generated. However, according to the embodiment, the spring forces A and B that intends to return the four bent portions 26 to 29 into the initial shapes affects against the stress, thus the spring forces A and B act as a cushion. Due to the flexible cable 13 molded as above-described, the liquid crystal body 3 can be fixed to the front bezel 2 and the backlight 4 like another configuration using a double coated tape having the supporting force and the cushion property. The flexible cable 13 is elastically deformed, but is not plastically deformed and creeped by appropriately choosing materials and laminating structures of the flexible cable 13. Accordingly, deterioration of the spring force of the flexible cable 13 can be avoided in a lifetime period of the display device 1.

The spring force A that returns the first bent portion 26 and the second bent portion 27 into the initial shapes presses the cable electrode 30 against the upper side 11 of the liquid crystal body 3. In addition, if external force is applied in a direction parallel to the display surface 10 of the liquid crystal body 3, the spring force that intends to return the bent portions 26 to 29 into the initial shapes can be against the external force.

Figure 6:
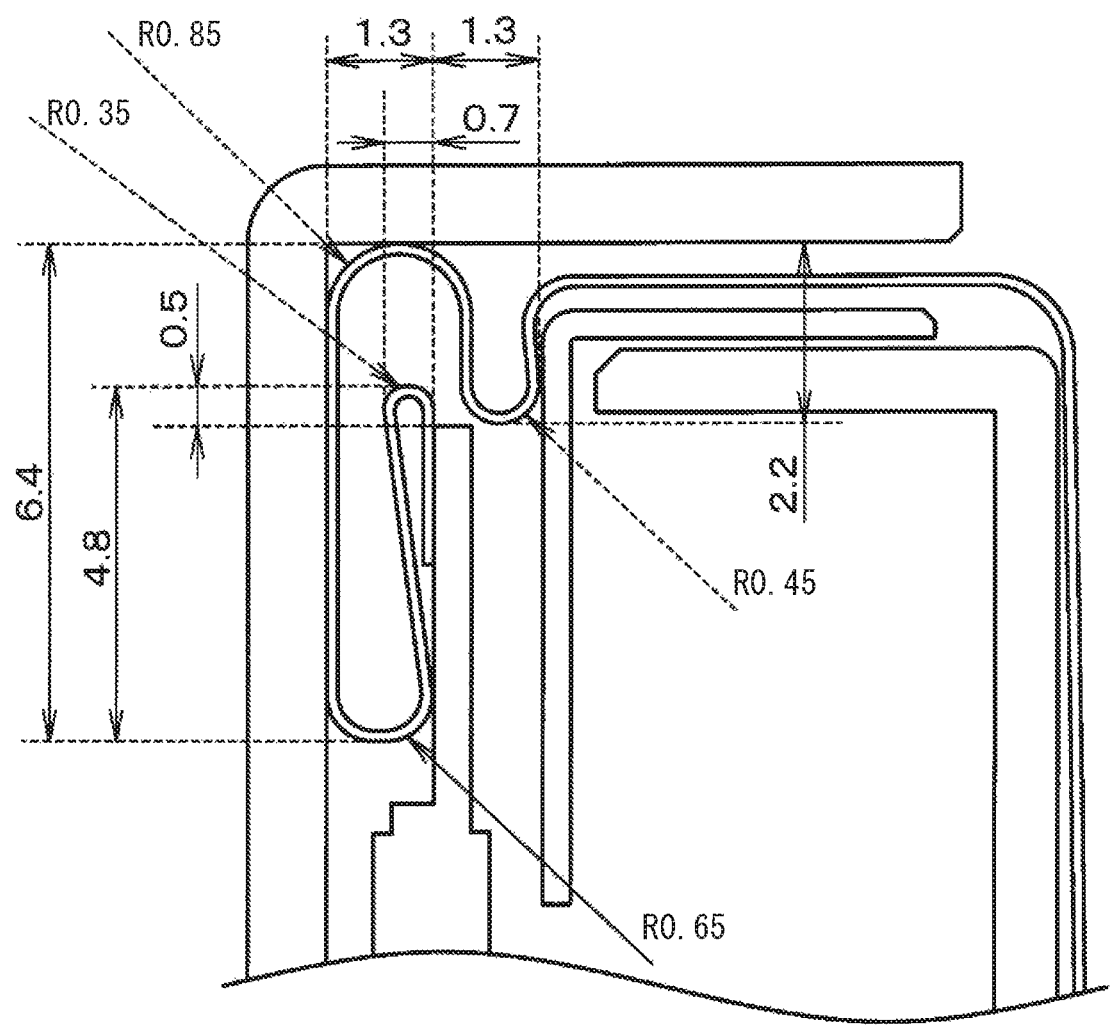
FIG. 6 is a schematic view illustrating a size of each element in the display device.

When a width of the wide portion 16 of the flexible cable 13 is "15.5 mm", and when a thickness of the wide portion 16 is "0.3 mm", the molding portion 18 has a size and shape shown in FIG. 6 in which the front bezel 2, the liquid crystal body 3, and the backlight 4 are assembled.

In the display device 1 for a vehicle, the molding portion 18 of the flexible cable 13 is molded to have spring force, and the liquid crystal body 3 is fixed to the front bezel 2 and the backlight 4 with the molding portion 18. The double coated tape is not needed in assembling the front bezel 2, the liquid crystal body 3, and the backlight 4, thus the number of members can be reduced. In addition, a step in which the liquid crystal body 3 is fixed to the front bezel 2 and the backlight 4 with the double coated tape is not required, which improves the assembly. Even if the external force is applied to the display device 1, stress derived by the external force can be relieved by the spring force of the molding portion 18 and quality loss is thereby avoided. Accordingly, in supporting the liquid crystal body 3 in the display device 1, the number of members is reduced, the assembly is improved, and the quality loss is avoided by relieving the stress derived by the external force even if the external force is applied to the display device 1.

The molding portion 18 includes the first bent portion 26, the second bent portion 27, the third bent portion 28, and the fourth bent portion 29. The molding portion 18 is bent to obtain a shape having the four bent portions 26 to 29 that generate the spring forces.

The part of the molding portion 18 between the tip end 18a and the first bent portion 26 is in contact with the liquid crystal body 3, and the second end 27b of the second bent portion 27 is in contact with the front bezel 2, thereby generating the spring force A between the front bezel 2 and the liquid crystal body 3 in the widening direction. The spring force A is applied in the direction to return the first bent portion 26 and the second bent portion 27 into the initial shapes. The spring force A acts as a cushion between the front bezel 2 and the liquid crystal body 3.

The first end 28a of the third bent portion 28 is in contact with the front bezel 2, and the second end 29b of the fourth bent portion 29 is in contact with the backlight 4, thereby generating the spring force B between the front bezel 2 and the backlight 4 in the widening direction. The spring force B is applied in the direction to return the third bent portion 28 and the fourth bent portion 29 into the initial shapes. The spring force B acts as a cushion between the front bezel 2 and the backlight 4.

Second Embodiment

Figure 7:
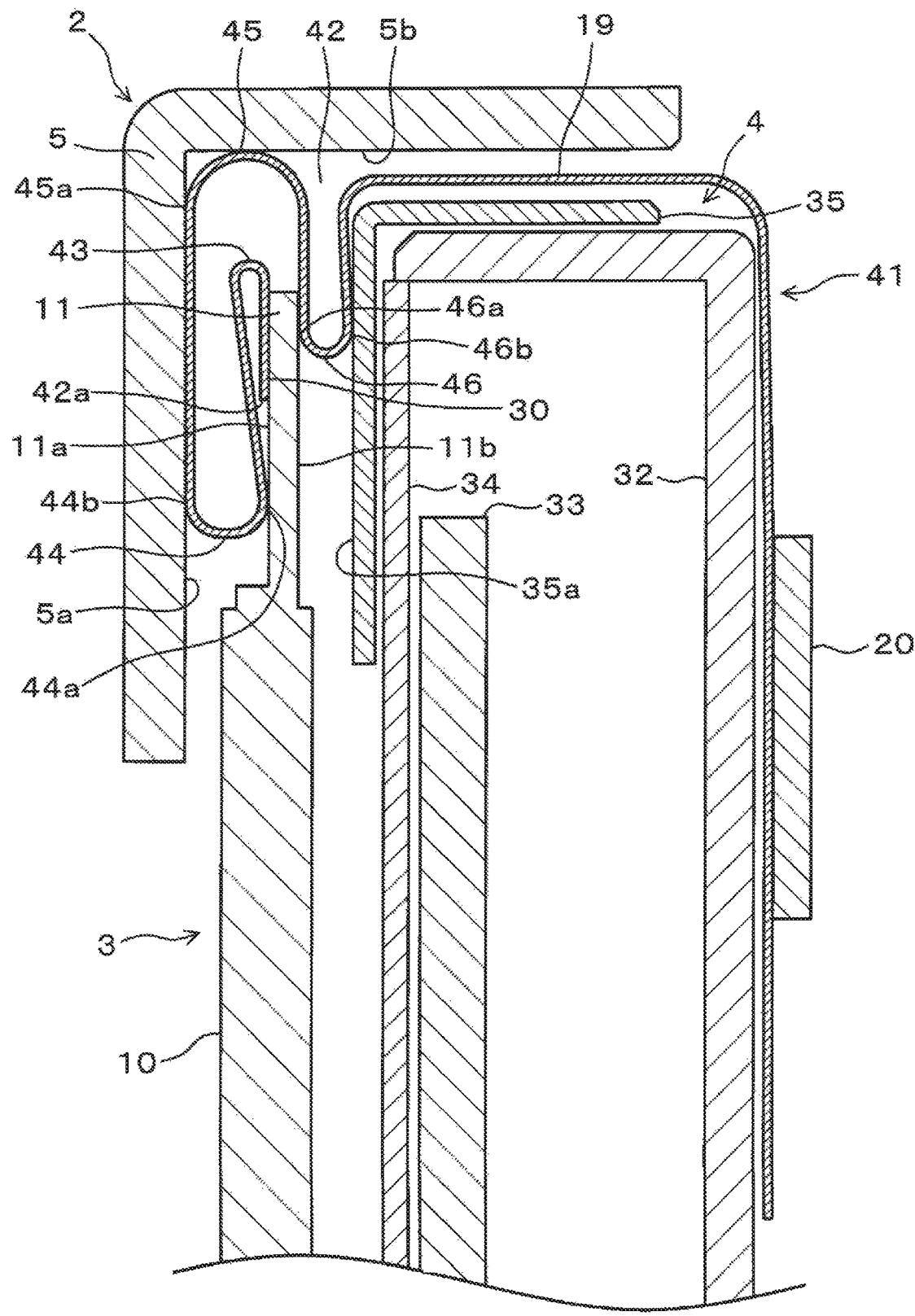
FIG. 7 is a vertical cross-sectional view illustrating an assembly of a front bezel, a liquid crystal body, and a backlight in a second embodiment.

Next, a second embodiment will be described with reference to FIGS. 7 and 8. Explanations about similar portions with the first embodiment will be omitted, and different portions from the first embodiment will be mainly described. In the first embodiment, the first end 29a of the fourth bent portion 29 is not in contact with the back surface 11b of the upper side 11 of the liquid crystal body 3. In the second embodiment, a first end of a fourth bent portion is in contact with the back surface 11b of the upper side 11 of the liquid crystal body 3.

A molding portion 42 of a flexible cable 41 has a tip end 42a connected to the liquid crystal body 3. The molding portion 42 is bent to have a first bent portion 43, a second bent portion 44, a third bent portion 45, and the fourth bent portion 46 arranged in this order from the tip end 42a to the non-molding portion 19. Each of the four bent portions 43 to 46 has a first end located closer to the tip end 42a and a second end located away from the tip end 42a similarly to the first embodiment. When the front bezel 2, the liquid crystal body 3, and the backlight 4 are assembled, the front bezel 2 and the liquid crystal body 3 are pressed against the backlight 4. In this time, the first end 44a of the second bent portion 44 is in contact with the front surface 11a of the upper side 11 of the liquid crystal body 3. A straight portion between the second end 44b of the second bent portion 44 and the first end 45a of the third bent portion 45 is in contact with the vertical inner surface 5a of the upper side 5 of the front bezel 2. The first end 46a of the fourth bent portion 46 is in contact with the back surface 11b of the upper side 11 of the liquid crystal body 3. The second end 46b of the fourth bent portion 46 is in contact with the vertical outer surface 35a of the frame 35 of the backlight 4.

Figure 8:
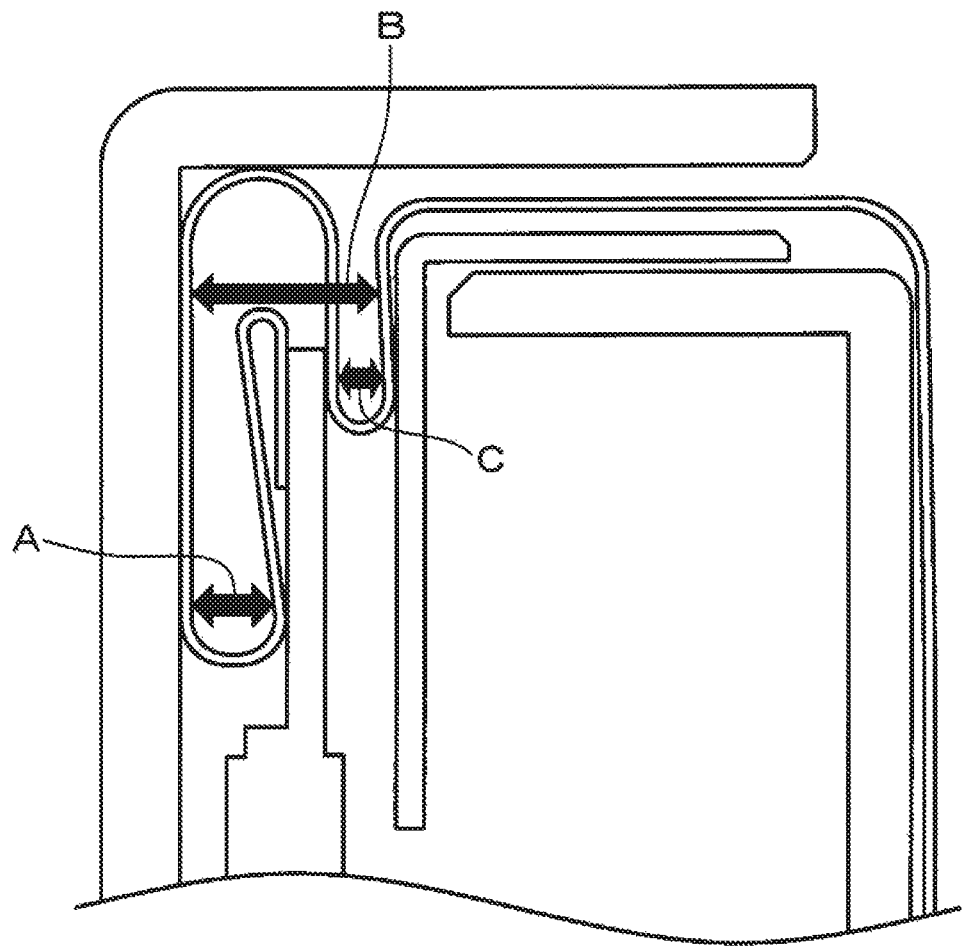
FIG. 8 is a schematic view illustrating spring force in the second embodiment.

In this case, as shown in FIG. 8, a spring force A is generated between the upper side 5 of the front bezel 2 and the upper side 11 of the liquid crystal body 3. The spring force A is applied in a direction to return the first bent portion 43 and the second bent portion 44 into the initial shapes. That is, the spring force A is applied in a widening direction in which a distance between the upper side 5 of the front bezel 2 and the upper side 11 of the liquid crystal body 3 is widened. A spring force B is also generated between the upper side 5 of the front bezel 2 and the frame 35 of the backlight 4. The spring force B is applied in a direction to return the third bent portion 45 and the fourth bent portion 46 into the initial shapes, i.e., in a widening direction in which a distance between the upper side 5 of the front bezel 2 and the frame 35 of the backlight 4 is widened. In addition, a spring force C is generated between the upper side 11 of the liquid crystal body 3 and the frame 35 of the backlight 4. The spring force C is applied in a direction to return fourth bent portion 46 into the initial shape, i.e., in a widening direction in which a distance between the upper side 11 of the liquid crystal body 3 and the frame 35 of the backlight 4 is widened. That is, the liquid crystal body 3 is fixed to the front bezel 2 and the backlight 4 such that the spring force A, the spring force B, and the spring force C are balanced with one another between the upper side 11 of the liquid crystal body 3 and the frame 35 of the backlight 4. Accordingly, the liquid crystal body 3 is supported in the display device 1.

According to the second embodiment as described above, the similar effect with the first embodiment can be obtained. The first end 46a of the fourth bent portion 46 is in contact with the liquid crystal body 3, and the second end 46b of the fourth bent portion 46 is in contact with the backlight 4, which generates the spring force C between the liquid crystal body 3 and the backlight 4. The spring force C that intends to return the fourth bent portion 46 into the initial shape acts as a cushion between the liquid crystal body 3 and the backlight 4.

Third Embodiment

Figure 9:
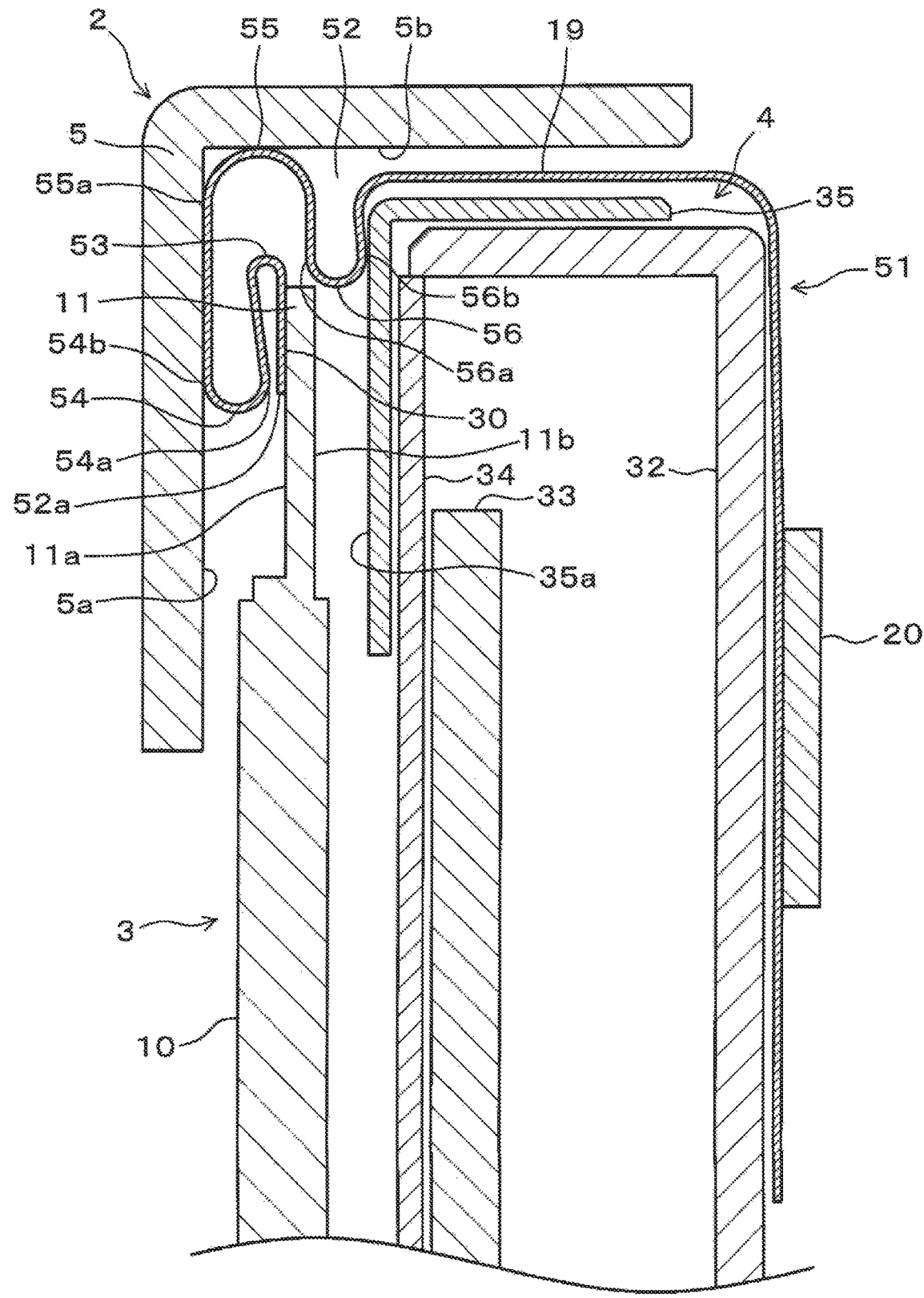
FIG. 9 is a vertical cross-sectional view illustrating an assembly of a front bezel, a liquid crystal body, and a backlight in a third embodiment.

Next, a third embodiment will be described with reference to FIGS. 9 and 10. In the third embodiment, a second bent portion 54 is not in contact with the front surface 11a of the upper side 11 of the liquid crystal body 3.

A molding portion 52 of a flexible cable 51 is bent to have a first bent portion 53, the second bent portion 54, a third bent portion 55, and a fourth bent portion 56 in this order from a tip end 52a of the molding portion 52 to the non-molding portion 19. Each of the four bent portions 53 to 56 has a first end located closer to the tip end 52a and a second end located away from the tip end 52a similarly to the first embodiment. When the front bezel 2, the liquid crystal body 3, and the backlight 4 are assembled, the front bezel 2 and the liquid crystal body 3 are pressed against the backlight 4. In this case, a straight portion between the second end 54b of the second bent portion 54 and the first end 55a of the third bent portion 55 is in contact with the vertical inner surface 5a of the upper side 5 of the front bezel 2. A part of the third bent portion 55 is in contact with the horizontal inner surface 5b of the upper side 5 of the front bezel 2, and the second end 56b of the fourth bent portion 56 is in contact with the vertical outer surface 35a of the frame 35 of the backlight 4.

Figure 10:
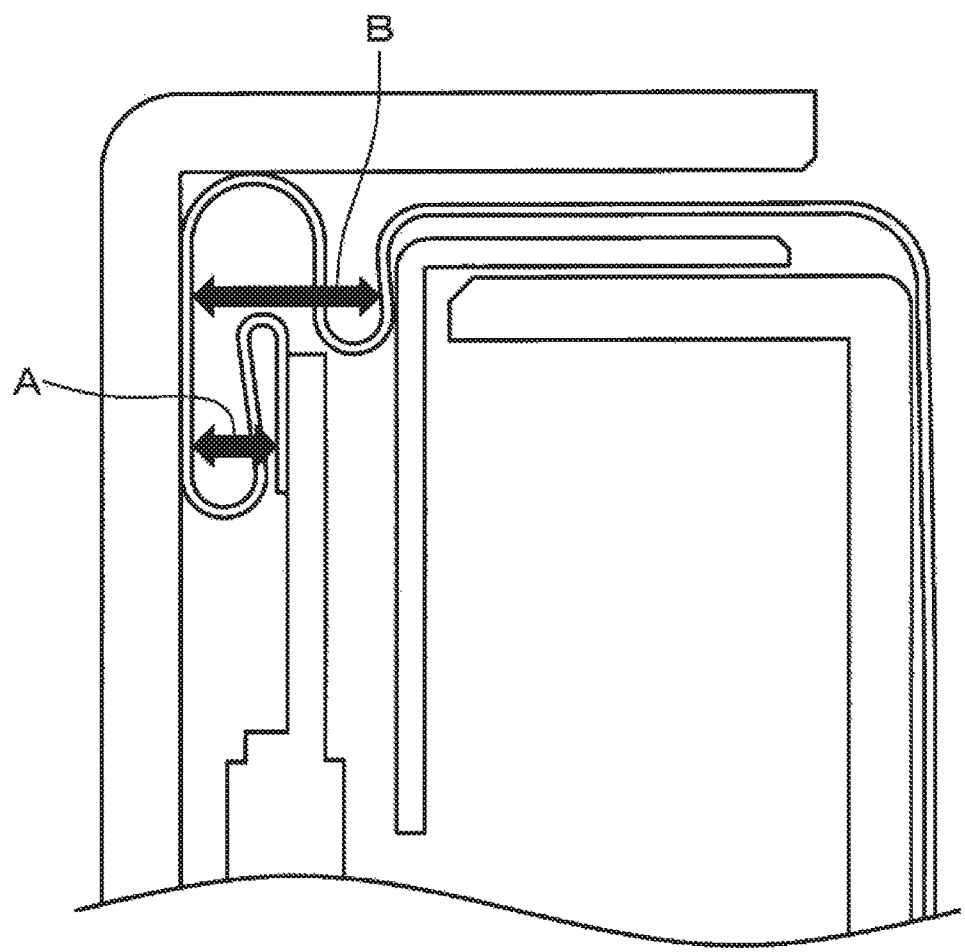
FIG. 10 is a schematic view illustrating spring force in the third embodiment.

In this case, as shown in FIG. 10, a spring force A is generated between the upper side 5 of the front bezel 2 and the upper side 11 of the liquid crystal body 3. The spring force A is applied in a direction to return the first bent portion 53 and the second bent portion 54 into the initial shapes. That is, the spring force A is applied in a direction in which a distance between the upper side 5 of the front bezel 2 and the upper side 11 of the liquid crystal body 3 is widened. A spring force B is also generated between the upper side 5 of the front bezel 2 and the frame 35 of the backlight 4. The spring force B is applied in a direction to return the third bent portion 55 and the fourth bent portion 56 into the initial shapes, i.e., in a direction in which a distance between the upper side 5 of the front bezel 2 and the frame 35 of the backlight 4 is widened. That is, the liquid crystal body 3 is fixed to the front bezel 2 and the backlight 4 such that the spring force A between the upper side 5 of the front bezel 2 and the upper side 11 of the liquid crystal body 3 is balanced with the spring force B between the upper side 5 of the front bezel 2 and the frame 35 of the backlight 4. Thus, the liquid crystal body 3 is supported in the display device 1.

According to the third embodiment described above, the similar effect with the first embodiment can be obtained. The first end 54a of the second bent portion 54 is not in contact with the liquid crystal body 3. Thus, the molding portion 52 can be downsized in a vertical direction, and the display device 1 can adopt the liquid crystal body 3 including the upper side 11 having a short length in the vertical direction. In other words, the length of the upper side 11 of the liquid body 3 can be shortened, which allows downsizing the display device 1.

Other Embodiment

The present disclosure is described according to embodiments, but is not limited to the embodiments and structures described above. The present disclosure includes various modifications and alternations in range of equivalence. In addition, various combinations, configurations, and other combinations and configurations including one element in addition to the various combinations and configurations are included in range of ideas in this disclosure.

A connecting portion of the flexible cable 13 with the upper electrode and a connecting portion of the flexible cable 14 with the lower electrode are located at opposite positions in the up and down direction, but the connecting portions may be located oppositely in a lateral direction.

The second embodiment may be combined with the third embodiment.

What is claimed is:

1. A display device for a vehicle comprising:
   a front bezel;
   a liquid crystal body;
   a backlight; and
   a flexible cable connected to the liquid crystal body at a predetermined position of the flexible cable, wherein
   the flexible cable includes a molding portion shaped to include a first bent portion, a second bent portion, a third bent portion, and a fourth bent portion arranged in order in a direction away from a tip end of the flexible cable,
   a part of the molding portion from the tip end to the first bent portion is in contact with the liquid crystal body, and an end of the second bent portion further from the tip end of the flexible cable is in contact with the front bezel to generate a spring force in a thickness direction of the liquid crystal body to widen a distance between the front bezel and the liquid crystal body, and
   the liquid crystal body is fixed to the front bezel and the backlight by the molding portion.

2. The display device for a vehicle according to claim 1, wherein
   an end of the third bent portion closer to the tip end of the flexible cable is in contact with the front bezel,
   an end of the fourth bent portion further from the tip end is in contact with the backlight, and
   the molding portion is shaped to generate a spring force in the thickness direction to widen a distance between the front bezel and the backlight.

3. The display device for a vehicle according to claim 1, wherein
   an end of the fourth bent portion connected to the third bent portion through a straight portion of the molding portion is distanced away from the liquid crystal body.

4. The display device for a vehicle according to claim 1, wherein
   an end of the fourth bent portion connected to the third bent portion through a straight portion of the molding portion is in contact with the liquid crystal body.

5. The display device for a vehicle according to claim 1, wherein an end of the second bent portion connected to the first bent portion through a straight portion of the molding portion is in contact with the liquid crystal body.

6. The display device for a vehicle according to claim 1, wherein
an end of the second bent portion connected to the first bent portion thorough a straight portion of the molding portion is distanced away from the liquid crystal body.

7. The display device for a vehicle according to claim 1, wherein
the molding portion is shaped to generate the spring force against an external force when the external force is applied in a direction perpendicular to a display surface of the liquid crystal body.

8. A display device for a vehicle, comprising:
a front bezel;
a backlight;
a liquid crystal body disposed between the front bezel and the backlight; and
a flexible cable disposed elastically deformable between the front bezel and the backlight, the flexible cable including a molding portion and a tip end connected to the liquid crystal body, wherein the molding portion has a first bent portion, a second bent portion, a third bent portion, a fourth bent portion that are arranged in order in a direction away from the tip end, a straight portion of the molding portion from the tip end to a first end of the first bent portion is in contact with the liquid crystal body, a second end of the second bent portion away connected to the third bent portion through a straight portion of the molding portion is in contact with the front bezel, and the liquid crystal body is fixed between the front bezel and the backlight by the molding portion.

* * * * *